United States Patent [19]
Wolf

[11] Patent Number: 5,636,800
[45] Date of Patent: Jun. 10, 1997

[54] PROCESS AND DEVICE FOR THE DISPOSAL AND RECYCLING OF LAMPS

[75] Inventor: Jurgen Wolf, Stein, Germany

[73] Assignee: Hetzel & Co. Elektronik-Recycling GmbH, Nuremberg, Germany

[21] Appl. No.: 515,117

[22] Filed: Aug. 15, 1995

[30] Foreign Application Priority Data

Aug. 18, 1994 [DE] Germany .................. 44 29 326.7

[51] Int. Cl.$^6$ .................................................. B02C 19/12
[52] U.S. Cl. ................. 241/14; 241/24.13; 241/24.22; 241/99; 241/200
[58] Field of Search ................ 241/99, 200, 14, 241/286, 24.13, 24.14, 24.15, 24.22, 24.3

[56] References Cited

U.S. PATENT DOCUMENTS

| | | | |
|---|---|---|---|
| 1,448,013 | 3/1923 | Warren | 241/200 |
| 1,704,823 | 3/1929 | Denny | 241/200 |
| 2,959,364 | 11/1960 | Anderson et al. | 241/200 |
| 3,691,942 | 9/1972 | Wagley | 241/200 X |
| 4,566,641 | 1/1986 | Okamoto et al. | 241/200 |
| 4,735,367 | 4/1988 | Brutosky | 241/200 X |

FOREIGN PATENT DOCUMENTS

| | | | |
|---|---|---|---|
| 0200697 | 4/1986 | European Pat. Off. | |
| 0248198 | 7/1993 | European Pat. Off. | |
| 298858 | 10/1983 | Germany | |
| 3932772 | 9/1989 | Germany | |
| 3909380 | 9/1990 | Germany | |
| 4030732 | 9/1990 | Germany | |
| 4219044 | 6/1992 | Germany | |
| 4302008 | 1/1993 | Germany | |
| 59106 | 1/1970 | Poland | 241/200 |
| 383463 | 8/1973 | U.S.S.R. | 241/200 |

*Primary Examiner*—Mark Rosenbaum
*Attorney, Agent, or Firm*—Jacobson, Price, Holman & Stern, PLLC

[57] ABSTRACT

There is described a process for the disposal and recycling of resistance (or incandescent) and/or discharge lamps by crushing the lamp bodies and separating the glass, metal, heavy metal and, if appropriate, fluorescent components of the lamps by crushing the lamp bodies by means of a squeezing device whose effective distance can be adjusted in such a way that no separation of the base glass and the lamp base will be effected. Another subject-matter of the invention is a squeezing device for carrying out the process, comprising a double-belt press with an adjustable distance between the upper and the lower belt.

2 Claims, 1 Drawing Sheet

PROCESS AND DEVICE FOR THE DISPOSAL AND RECYCLING OF LAMPS

DESCRIPTION

The present invention is concerned with a process and a device for the disposal and recycling of resistance (incandescent) lamps and/or discharge lamps by crushing the lamps, separating and recovering the glass, metal, heavy metal and, if appropriate, fluorescent components of the lamps.

Both low-pressure lamps and high-pressure lamps are waste products which, by reason of the materials contained therein, are difficult to dispose of, and which usually are considered as special waste which can be dumped only in places for special waste. They contain a large variety of metals in the form of fluorescent substances (low-pressure lamps) and in the form of halides (metal vapour lamps), as well as mercury and mercury compounds. Besides this, lamps of this kind comprise different glass materials, on the one hand in the lamp body, and on the other hand in the base, and they also comprise metallic parts in the filament support and in the base holder.

FIG. 4 of the attached drawing is a schematic partial view of a rod-shaped fluorescent tube. This fluorescent tube comprises a lamp body 20 which consists normally of soda-lime glass. The base 21 comprises the base glass 22 which, because of the metal contacts 25 to be sealed-in and the support 23 carrying the filament 24, usually consists of lead glass. The base 21 furthermore comprises a metal holder 27 as well as a Pertinax plate 26 for insulation, as well as the adhesive cement 28 by means of which The metal holder 27 is bonded to the lamp body. The fluorescent substance which comprises, in particular, oxides of rare-earth elements is disposed on the inner surface of the lamp body 20; the lamp contains the mercury that is needed for operating the lamp. A corresponding design is applied in the conventional general-service resistance lamps; these do not contain any fluorescent substance or mercury, however, but comprise different metals and glass types in the lamp body on the one hand, and in the lamp base on the other hand.

The general procedure applied in the hitherto customary methods of disposal and recycling is to crush the lamps by mechanical means and then separate the components of the resultant mixture of lamp fragments from one another. Here it is possible, of course, to separate the metallic components, the fluorescent substance and the glass material from one another. During crushing of the lamps and separation of the components, the ambient atmosphere is usually excluded so as to avoid any harmful effects of the heavy metals on the surroundings.

European Patent Specification EP 0 248 198 B1 describes a plant for the disposal of fluorescent and gas pressure lamps, which plant is suitable for carrying out the above-described procedure. Corresponding methods of recycling fluorescent lamps and waste glass from broken lamps also represent the subject-matters of German Patent Application DE 39 09 380 A1 and DE 40 30 732 A1. European Patent Application EP 298 035 A2 suggests crushing the fluorescent tubes under water and then recovering especially the rare-earth metals of the fluorescent substances.

These methods suffer from the drawback that the recycled materials can be utilized only at a low level because, when crushing the lamps, there will be obtained only a single glass fraction which consists of a mixture of the lead glass of the base and the normally used soda-lime glass of the lamp body. Thus, the content of lead glass of the base makes it impossible to reutilize the glass mixture obtained in this way directly in the manufacture of new lamp bodies.

There have, however, also been described methods of recycling especially fluorescent tubes, wherein the ends of the fluorescent lamp comprising the base are separated and then the base on the one hand and the lamp body on the other hand are reprocessed separately (European Patent Application EP 0 200 697 A2). As a result of this it is possible to utilize the individual components of the lamp for disposal at a higher level in that the soda-lime glass of the lamp bodies can be reutilized in the manufacture of tubes. However, this process is very laborious since the fluorescent lamps must be charged to the base-separating device separately, which will be particularly difficult in the case where not only straight fluorescent tubes but also circular or otherwise curved power-saving lamps as well as general-service resistance lamps are to be reprocessed.

The object of the present invention is to provide a process, and a device suitable therefor, by which process and device it is possible to reprocess not only fluorescent lamps which are rod-shaped but also fluorescent lamps of any other desired shape, gas-discharge lamps and standard domestic resistance lamps in an easy and economic manner in such a way that high-level recovery of the components of the old lamps, especially separation of the glasses of the lamp body on the one hand and of the lamp base on the other hand is possible.

It has been found that this object can be accomplished by breaking the lamps for disposal or recycling by means of a squeezing device whose effective working gap is adjusted in such a way that crushing only of the lamp body glass but not crushing of the base glass or separation of the latter glass from the base and/or support will take place. This is due to the fact that both in the case of fluorescent lamps and in the case of resistance lamps, the lamp body usually has a diameter larger than the diameter of the lamp base and the lamp base comprises a metal holder bonded by means of adhesive cement so that, when preventing breaking of the base glass and separation of this glass from the base and/or support, it is possible to neatly separate the glass of the lamp body from the glass of the base.

The subject-matter of the invention therefore is the process as claimed in claim 1 as well as the device as claimed in claim 3. The subclaims relate to preferred embodiments of the subject-matter of this invention.

The invention therefore relates to a process for the disposal and recycling of resistance and/or discharge lamps by crushing the lamps, separating and recovering the glass, metal, heavy metal and, if appropriate, fluorescent components of the lamps, the process being characterized in that the crushing of the lamps is accomplished by means of a squeezing device whose effective distance is adjusted in such a way that crushing of the glass of the lamp body but not crushing of the base glass or separation of the latter glass from the base and/or support will be effected.

Another subject-matter of the invention is a device for carrying out this process, viz. a squeezing device in the form of a double-belt press with an adjustable effective distance between the upper continuous belt and the lower continuous belt.

In the following, the invention will be explained more fully, with reference to the attached drawings.

Figure 1:
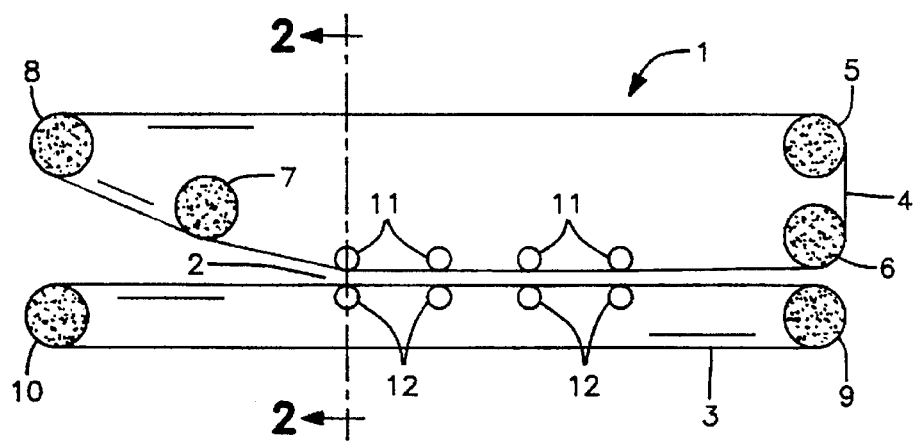
FIG. 1 is a schematic side view of the squeezing device according to the invention.

As is shown in FIG. 1, the squeezing device according to the invention comprises a double-belt press 1 with an adjustable effective distance 2 between the lower continuous belt 3 and the upper continuous belt 4. The continuous belts 3 and 4 are guided over the guide rollers 9 and 10, and over the guide rollers 5, 6, 7 and 8 respectively, and are drivable in synchronous manner in the gap between the rollers by means of a driving system, which is not shown here. The effective working gap 2 between the lower continuous belt 3 and the upper continuous belt 4 is adjustable by means of the lower and upper press rollers 11 and 12 respectively which are displaceable with respect to one another, and via the control device 19 (see FIG. 2). Of course, there may also be present a higher or lower number of the four pairs of press rollers 11 and 12 shown in FIG. 1, or alternatively, these pairs of press rollers may be replaced by appropriately adjustable pressure plates. It is essential, however, that the roll gap 2 be adjustable in such manner that it is a bit smaller than the diameter of the lamp body and a bit larger than the diameter of the lamp base so that crushing only of the lamp body will take place.

Figure 4:
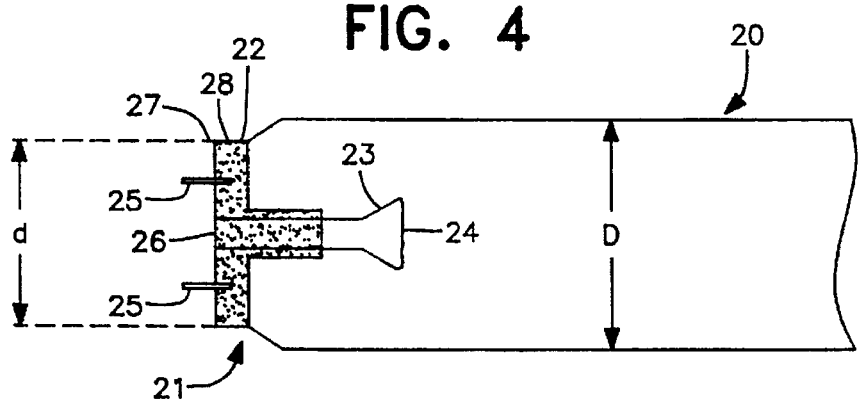
FIG. 4 is a schematic sectional view of a rod-shaped fluorescent lamp.

As is shown in FIG. 4, usually the diameter D of the lamp body of the fluorescent tube is larger than the diameter d of the lamp base. This also applies accordingly to the bulb-shaped general-service resistance lamps, of course, where this difference is markedly higher.

Thus, the squeezing device according to the invention, with the distance 2 being adjusted accordingly to a distance which is slightly smaller than the diameter D of the lamp body, makes it possible to destroy only the lamp body so that only fragments of glass of the lamp body 20 on the one hand and the largely intact lamp bases 21 will emerge from the delivery end of the double-belt press 1. Said lamp bases 21 comprise the base glass 22 which usually consists of lead glass, the support 23 with the filament 24, the metallic contacts 25, the metal holder 27 which usually consists of aluminum, the insulation plate 26, and the adhesive cement material 28 which joins these components together. On account of the adherent metal components it is thus easily possible to separate the base glass 22 from the soda-lime glass of the lamp body 20 so that the latter glass can be reutilized directly in the manufacture of new lamp bodies.

The upper and lower continuous belts 3, 4 of the squeezing device according to the invention are preferably composed of a flexible material such as fabric-reinforced plastic or rubber, or alternatively, of metal, preferably a metal-chain belt. In this way, the flexibility of the belt ensures that further breaking of the base and, thus, mixing of the base glass and the broken glass of the lamp body are largely prevented.

Figure 2:
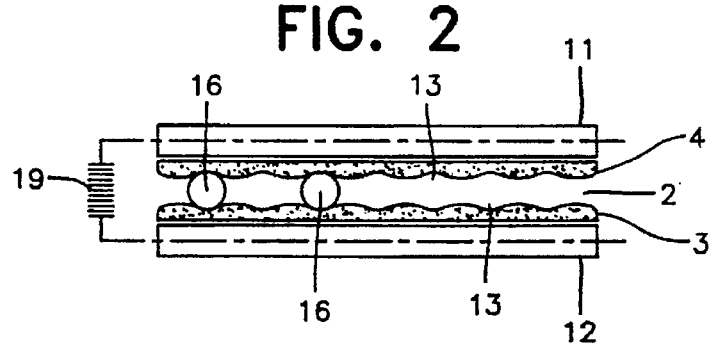
FIG. 2 is an enlarged partial sectional view along the line A—A of FIG. 1 in the area of the first pair of press rollers of the squeezing device.

According to a preferred embodiment, which is shown in FIG. 2, of the squeezing device of the invention the working surface of the lower and/or upper continuous belts 3 and 4 is provided with guiding grooves 13. These guiding grooves 13 will cause an automatic orientation of the lamps 16 to be treated, which lamps are charged to the working gap 2 of the double-belt press 1 on the feed side. As is shown further in FIG. 2, the press rollers 11 and 12 are displaceable with respect to one another by means of the control device 19 so that the distance 2 of the working gap of the double-belt press has the dimensions required to ensure that only the lamp body will be crushed, but not the lamp base with the base glass contained therein.

Figure 3:
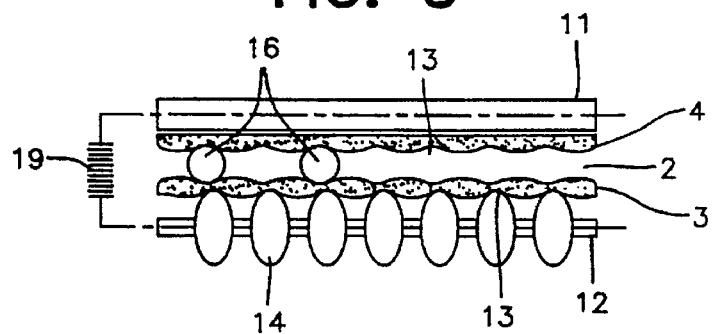
FIG. 3 is a partial sectional view of another embodiment of said pair of press rollers.

According to another embodiment, which is shown in FIG. 3, of the squeezing device of the invention the lower press roller 12 comprises a plurality of individual rollers 14 so that the lower continuous belt 3 which, in principle, is plane is provided, within the effective working gap, and above said lower press roller 12, with the longitudinal guiding grooves 13 preferred according to the invention. In this case, too, the press rollers 11 and 12 are displaceable with respect to one another by means of the control device 19 in such a way that the distance required for the breaking of the lamp body in accordance with the invention is ensured.

According to a further preferred embodiment, the working surface of the lower and/or upper continuous belt 3, 4 can be provided with guiding knobs in transverse direction, which guiding knobs, together with the preferred longitudinal guiding grooves, ensure that the lamps to be treated are guided through the device, and crushed, separately and safely without any manual or other separate feeding.

In carrying out the process according to the invention, the lamps for disposal and recycling, whether rod-shaped, circular or U-shaped fluorescent lamps, gas discharge lamps or resistance lamps, are passed through the working gap of the squeezing device according to the invention. The mixture of remaining parts emerging from the double-belt press 1, which mixture comprises the broken glass of the lamp body 20 and the largely intact bases 21, is passed through a metal separator in which the glass of the lamp body 20 is separated from the base 21. The glass of the lamp body 20 separated in this way is separated further by means of an air/shaking screen to recover, on the one hand, the glass components, and on the other hand, a mixture of powdered glass, fluorescent material and mercury. The glass components which are obtained in purified form can then be used directly for the new production of fluorescent tubes or lamp bulbs. From this mixture of powdered glass and fluorescent material, furthermore the fluorescent material can be separated then, by means of distillation, from the mercury present.

The lamp bases emerging from the metal separator, which bases comprise the metals of the holder consisting of aluminum, of the support 23 with the filament 24, and the contacts 25, are broken in a roll type crusher combination and then passed through a metal separator again. In doing so, on the one hand the base glass together with remainders of the adhesive cement is obtained, and on the other hand the insulation plate 26 as well as the metal components, viz. the aluminum of the holder 27 and the metal components of the contacts 25, the support 23 and the filament 24 are obtained.

In contrast to the customarily applied lamp-crushing devices, the squeezing device according to the invention makes it possible to break the lamps in such fashion that bulb glass or tube glass can be separated from base glass easily. As such separation is achievable in a simple manner, merely by appropriately adjusting the effective distance of the roll gap of the squeezing device according to the invention, simple and inexpensive recycling of lamps of any desired shape is made possible, since the squeezing device according to the invention, as said before, can be adjusted specifically to the distance required.

It goes without saying that the entire plant is closed in an air- and dust-tight manner. The air which has been purified of dust and mercury is resupplied to the plant, after purification devices such as sintered lamellar filters and impregnated activated carbon filters, in circulation via the lamp inlet of the squeezing device and the crusher/screen combination respectively. To maintain a certain negative pressure, less than 10% of the air are exchanged. By this procedure, which is, admittedly, a procedure that is customarily applied, a very good degree of separation of the harmful substances is ensured.

By means of the process according to the invention and the squeezing device according to the invention it is possible to achieve optimum separation of the glass of the lamp body (bulb glass and tube glass respectively) which consists predominantly of soda-lime glass, and the glass of the support and the base which usually consist of lead glass. The device according to the invention makes possible not only optimum separation of the two glass types but also universal use in that all lamps whose base has a diameter smaller than that of the lamp body can be treated. Since this applies to the majority of low-pressure discharge lamps (fluorescent lamps) as well as to high-pressure lamps (such as metal vapour lamps) and also resistance lamps, it is easily possible in the recycling of such lamps to separate the glass of the lamp body from the base glass and from the inner bulb respectively.

In addition to this, the device according to the invention also makes it possible to recycle and dispose of damaged or broken lamps since, as said before, the effective distance 2 of the double-belt press 1 is adjusted in such a way that it is larger than the diameter d of the base so that crushing of the base glass 22 is largely prevented specifically by the combination with the longitudinal guiding grooves, which are preferred according to the invention, of the continuous belts 3 and 4 respectively.

I claim:

1. A process for disposing and recycling glass lamps, having a base/support, a glass base attached to the base/support, and a glass body, comprising the steps of crushing the lamps, separating and recovering lamp glass, lamp non-heavy metals, lamp heavy metals, and, if present in the lamps, lamp fluorescent components, wherein crushing is effected by a squeezing device having an adjustable effective distance that permits crushing the lamp body glass without crushing the lamp base glass or separating the lamp base glass from the lamp base.

2. The process of claim 1, wherein the effective distance of the squeezing device is adjustable to a distance smaller than the diameter of the glass body, but larger than the diameter of the base/support.

* * * * *